United States Patent [19]

Hayashi

[11] 4,136,984

[45] Jan. 30, 1979

[54] CLAMP-CONNECTOR FOR JOINING TUBULAR MEMBERS

[76] Inventor: Henry T. Hayashi, 2373 Abreu Rd., Union City, Calif. 94587

[21] Appl. No.: 808,044

[22] Filed: Jun. 20, 1977

[51] Int. Cl.² .............................................. F16B 7/04
[52] U.S. Cl. .................................. 403/170; 403/174; 403/176; 403/217; 403/231
[58] Field of Search .............. 24/274 WB; 248/64, 69, 248/74 B, 74 PB; 339/251; 403/188, 217, 391, 400, 175, 170, 176

[56] References Cited

U.S. PATENT DOCUMENTS

| 761,595 | 5/1904 | Matteson | 403/217 |
|---|---|---|---|
| 885,240 | 4/1908 | Graham | 285/150 |
| 885,992 | 4/1908 | Graham | 285/150 |
| 2,696,396 | 12/1954 | Pittaluga | 403/171 |
| 2,711,917 | 6/1955 | Blu | 403/171 |
| 3,062,570 | 11/1962 | Schwartz | 403/172 |
| 3,297,817 | 1/1967 | Stier | 403/400 X |
| 3,579,173 | 5/1971 | Greener | 339/251 X |
| 4,032,096 | 6/1977 | Perrault et al. | 248/74 B X |

FOREIGN PATENT DOCUMENTS

| 2352430 | 9/1975 | Fed. Rep. of Germany | 339/251 |
|---|---|---|---|
| 60228 | 4/1954 | France | 403/217 |
| 600163 | 11/1959 | Italy | 403/175 |

OTHER PUBLICATIONS

Stepler, R., *Tube/Clamp System,* Popular Science, pp. 100, 101, Jun. 1977.

*Primary Examiner*—Robert Mackey
*Attorney, Agent, or Firm*—James R. Cypher

[57] ABSTRACT

A clamp-connector for joining tubular members. The tubular members need not be threaded, welded, drilled, or bolted. The clamp-connector consists briefly of a sheet metal bracket formed with quarter-round portions for cradling the tubular members and openings for receiving the clamps. The clamps are standard worm gear clamps with perforated straps. The brackets may be shaped to hold the tubular members in two or more planes.

2 Claims, 15 Drawing Figures

CLAMP-CONNECTOR FOR JOINING TUBULAR MEMBERS

BACKGROUND OF THE INVENTION

Metal and plastic tubing has come into wide spread usage in constructing racks, stands, railings, benches, tables, shelves, scaffolds, etc. for industrial, commercial and home do-it-yourself projects. Many different connectors have been devised to connect the tubing. Graham, U.S. Pat. No. 885,240, Apr. 21, 1908 and U.S. Pat. No. 885,992, Apr. 28, 1908 provided a cast bracket which connected pipe by inserting bolts through holes drilled in the pipe.

Pittaluga, U.S. Pat. No. 2,696,396, Dec. 7, 1954 and Blu, U.S. Pat. No. 2,711,917, June 28, 1955 provided connectors which in effect were clamps for joining pipes. The connectors would only take one size pipe.

Schwartz, U.S. Pat. No. 3,062,570 formed his connector from a sheet metal member but there was no positive connection between the connector and the tubular member. The pipe was held to the connector merely by the friction in the pre-bent cut-out strap-like portions.

SUMMARY OF THE INVENTION

The gist of the present invention is the construction of a novel bracket from sheet metal which in combination with a standard worm gear clamp can be used to construct a wide variety of structures from tubular members or rods.

The present clamp-connector provides an inexpensive means for joining tubular members in the construction of racks, stands, railings, benches, tables, shelves, scaffolds, bracing and many other structures.

The clamp-connector needs only a screw driver to make all the connections and thus it can be used by do-it-yourselfers as well as industrial and commercial applications.

When stainless steel, worm gear clamps are used, the finished project is rigid, of high load capacity, deterioration proof and neat in appearance.

The use of a worm gear clamp rather than a single screw fastener provides increased rigidity and strength.

The clamp-connector system is less expensive since there are no metal castings, no drilling of pipes or pipe threading requirements.

The clamp-connectors may be replaced without unfastening other parts of the structure.

Each clamp or each bracket can be used with several different diameter tubular members.

DESCRIPTION OF THE PREFERRED EMBODIMENTS

Figure 1:
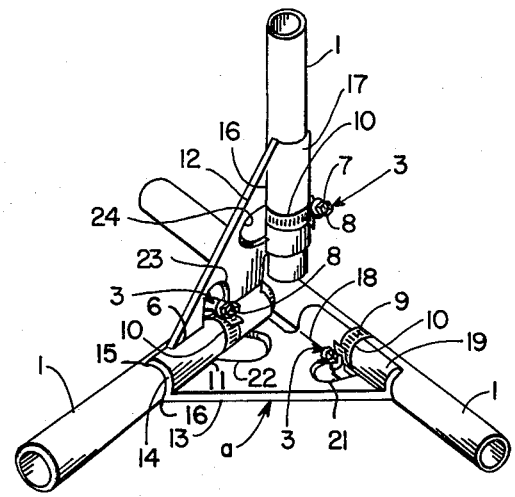
FIG. 1 is a perspective view of a clamp-connector of the present invention.
Figure 2:
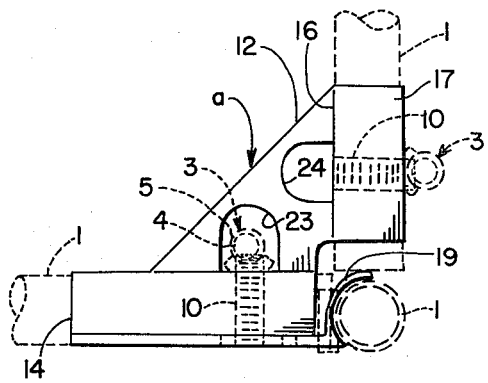
FIG. 2 is a side view of the clamp-connector of FIG. 1.

This application discloses a system of clamp-connectors for joining circular tubular members 1. The clamp-connectors include a structural sheet metal bracket a, b, c, d, e, f or g forming at least two angularly related curved portions and joined by a web portion. The curved portions are adpated for cradling portions of the structural tubular members. At least one clamp opening is formed through the web portion at the intersection of each of the curved portions and the web portion. Every clamp-connector has a second opening formed through the web portion at the intersection of the curved portion and the web portion.

Each of the brackets has two or more clamp means including a strap inserted through the openings and adapted for encircling each of the curved portions and the structural tubular members cradled therein.

The curved portion could nearly encircle the structural tubular members, but preferably, the curved portion is limited to an approximately 90° arc. With the curve portion thus limited, the bracket may accommodate the structural tubular members having a range of different diameters. If the curved portion encircled the structural tubular member almost entirely, then the sizes of structural tubular members which could be accommodated would be severely limited.

The clamp means 3 may be standard worm gear clamps made by Wittek Mfg. Co. One of the common uses for this type of clamp is to hold water hoses on automobile heaters and radiators. The clamp means have a worm gear 4 journaled for rotation on a housing 5. The end of the worm gear shanks may be formed with hexagonal heads 7 so that a wrench may be used to turn the worm gear. They also may be formed with slots 8 so that a screw driver can turn the worm gear. The worm gear is mounted so that it engages the slits 9 (See FIG. 1) in the strap 10. As the worm gear is turned, the strap is wound more tightly about the bracket and structural tubular member.

Referring specifically to FIG. 1, the bracket "a" includes a first web 12 and a second web 13 positioned at right angles to one another at first and second inner edges 6 and 11 to the first and second outer edges 15 and 16 of and joined a first curved portion 14. The first web is formed with a first edge 16 at right angles to the first curved portion and the bracket is formed with a second curved portion 17 adjoining the first edge. The second web 13 is formed with a second edge 18 at right angles to the first curved portion 14 and at right angles to the second curved portion 17 and the bracket "a" is also formed with a third curved portion 19 adjoining the second edge 18. The curved portions are positioned with respect to the web portions so that structural tubular members 1 are cradled in the curved portions and are adapted to intersect one another. Openings 21, 22, 23 and 24 permit receipt of the clamp straps therethrough. Preferably the openings are large enough to permit passage of the clamp housing.

Figure 3:
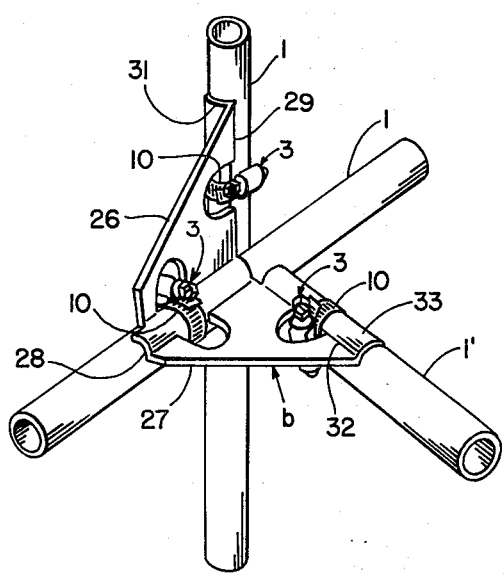
FIG. 3 is a perspective view of another form of the clamp-connector of the present invention.
Figure 4:
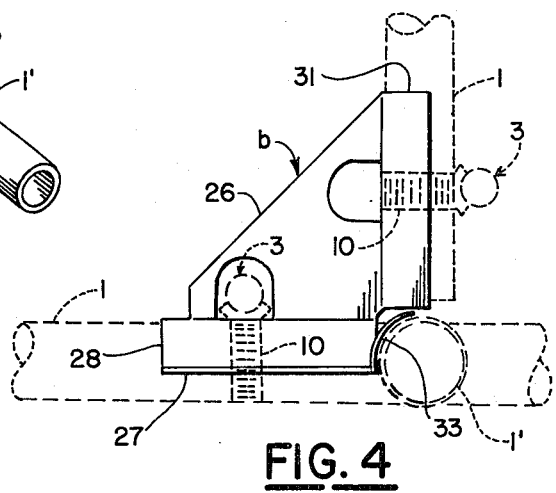
FIG. 4 is a side view of the clamp-connector of FIG. 3.

Referring specifically to FIGS. 3 and 4, the clamp-connector includes a bracket b which is formed with a first web 26 and a second web 27 positioned at right angles to one another; joined by a first curved portion 28. The first web 26 is formed with a first edge 29 at right angles to the first curved portion 28 and the bracket b is formed with a second curved portion 31 adjoining the first edge 19. The second web 27 is formed with a second edge 32 at right angles to the first curved portion 28 and at right angles to the second curved portion 31 and the bracket is also formed with a third curved portion 33 adjoining the second edge 32. The curved portions are positioned with respect to the web portions so that the tubular members 1 and 1' are cradled in the second and third curved portions and intersect one another. Also, the tubular member 1 cradled in the first curved member 28 does not intersect tube 1 cradled in the second curved portion 31. To illustrate the fact that different size tubular members may be used, tube 1' is larger than tube members 1, even though the radius of curvature of curved portion 33 is the same as the radius for curved portions 28 and 31.

Figure 5:
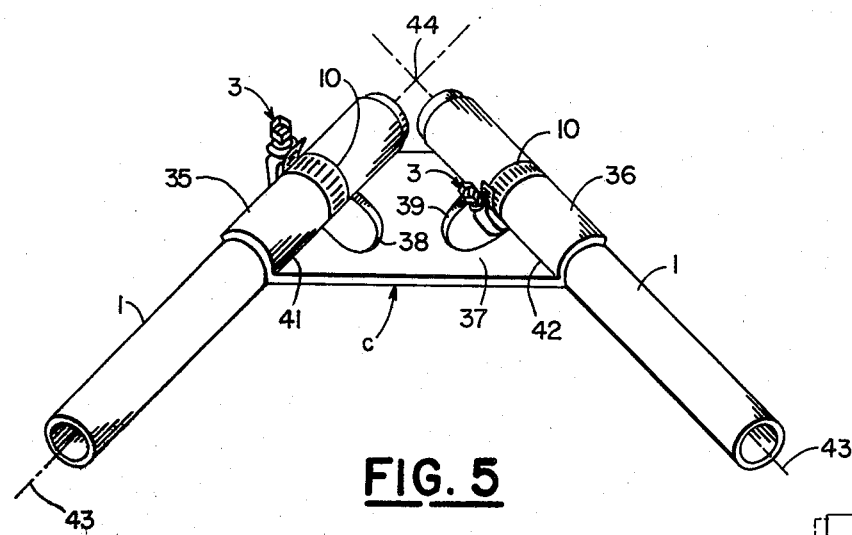
FIG. 5 is a perspective view of a 90° clamp-connector.
Figure 6:
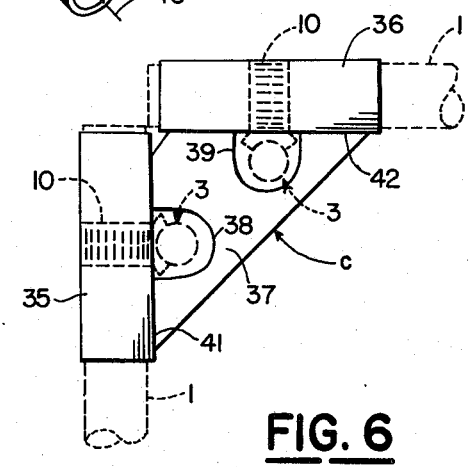
FIG. 6 is a side view of the clamp-connector of FIG. 5.

Referring specifically to FIGS. 5 and 6, the clamp connector consists of a sheet metal bracket C formed with a first curved portion 35 angularly related to a second curved portion 36. The curved portions are joined by a web portion 37. The curved portions are adapted for cradling portions of the tubular members 1. Clamp openings 38 and 39 are formed through the web at the intersections 41 and 42 of each of the curved portions and the webs.

Clamps 3 have straps 10 which encircle the curved portions 35 and 36 and the tubular members 1 cradled therein. The curved portions 35 and 36 are positioned with respect to one another so that the axis 43 of the tubular members intersect one another at point 44.

Figure 7:
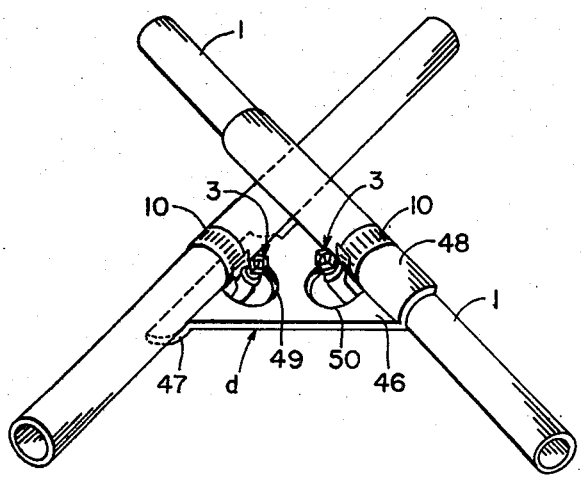
FIG. 7 is a perspective view of a 90° crossover clamp-connector.
Figure 8:
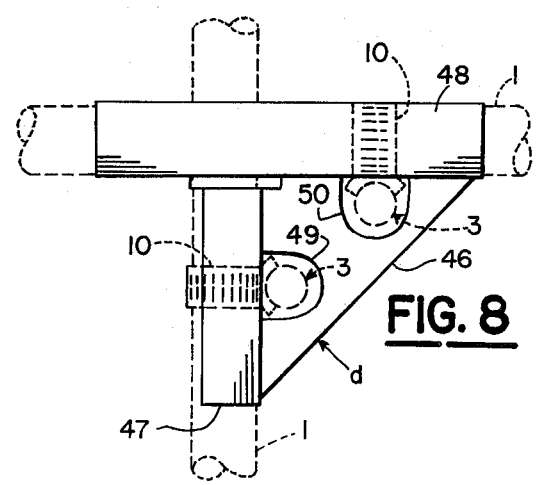
FIG. 8 is a side view of the clamp-connector of FIG. 7.

Referring to FIGS. 7 and 8, the clamp connector consists of a sheet metal bracket d formed with a web portion 46 and angularly related curved portions 47 and 48. The web is formed with openings 49 and 50 for receiving bands 10 therethrough. Clamps 3 tighten the bands about the curved portions and tubular members. The curved portions 47 and 48 are positioned with respect to one another so that the tubular members 1 do not intersect and are in parallel planes. This is accomplished by arranging the curved portion 47 in a concave position and the curved portion 48 in a convex position in relation to each other and to the web.

Figures 9, 10, 11, 12:
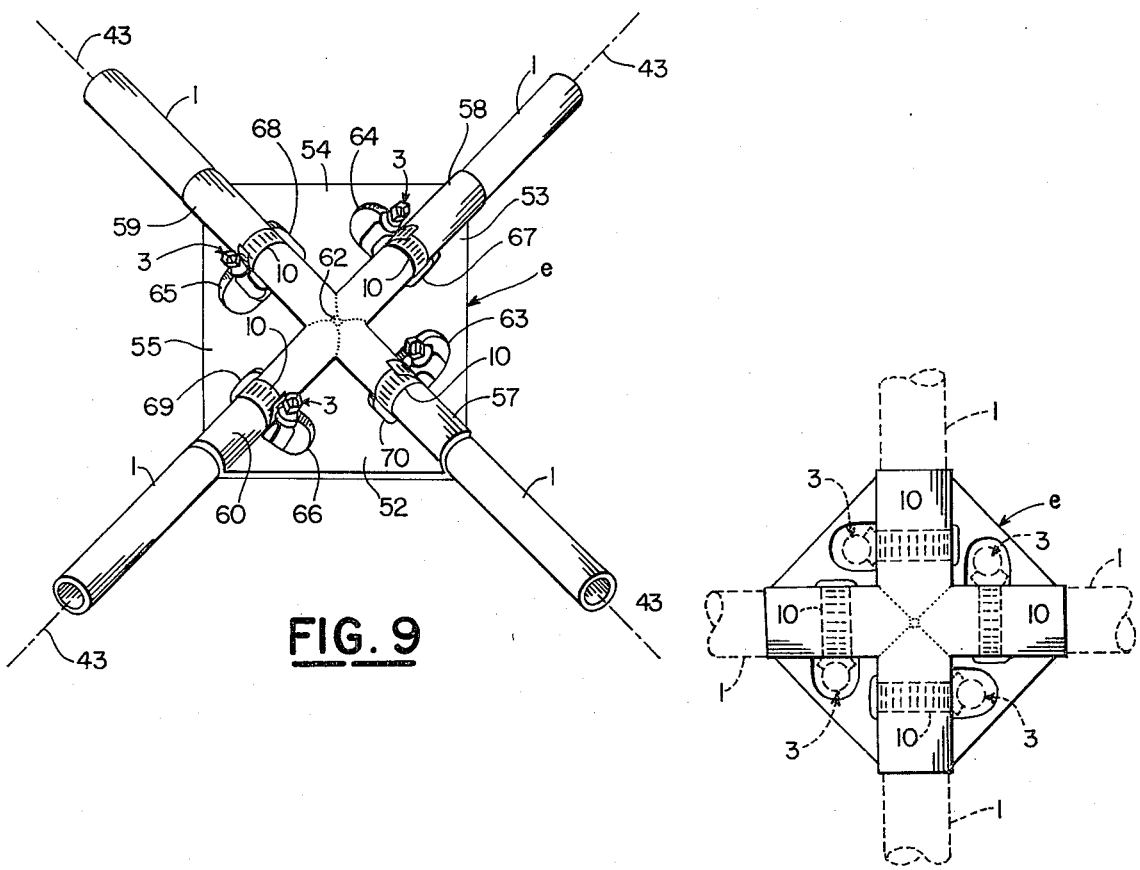
FIG. 9 is a perspective view of a cross type clamp-connector.
FIG. 10 is a top plan view of the clamp-connector of FIG. 9.
FIG. 11 is a perspective view of the clamp-connector which places the tubes in the same plane and at an angle of less than 90°.
FIG. 12 is a plan view of the clamp-connector of FIG. 11.

FIGS. 9 and 10 show still another type of bracket in the clamp-connector series. The sheet metal bracket e includes first, second, third and fourth webs 52, 53, 54 and 55 lying in one plane and including first, second, third and fourth curved portions 57, 58, 59 and 60. Each curved portion is connected to adjoining web portions and positioned to lie in a single plane. This arrangement positions the tubular members 1 so that their axis 43 all intersect at a common point 62. Clamps 3 with their respective bands 10 encircle the curved portions and the tubular members as previously explained. The bracket is formed with openings 63, 64, 65, 66, 67, 68, 69 and 70 to receive the bands and clamps therethrough.

FIGS. 11 and 12 show a typical connector-clamp in which tubular members 1 are held at an angle less than 90°. The curved portions 72 and 73 are connected to web 74 and are both convex in relation to one another and therefore hold the tubular members in the same plane so that the axes 43 of the tubular members intersect one another at point 75. Clamps 3 with straps 10 encircle the curved portions and the tubular members as in all of the other connector-clamps. Openings 77 and 78 formed in the web receive the clamps and bands therethrough.

Figures 13, 14:
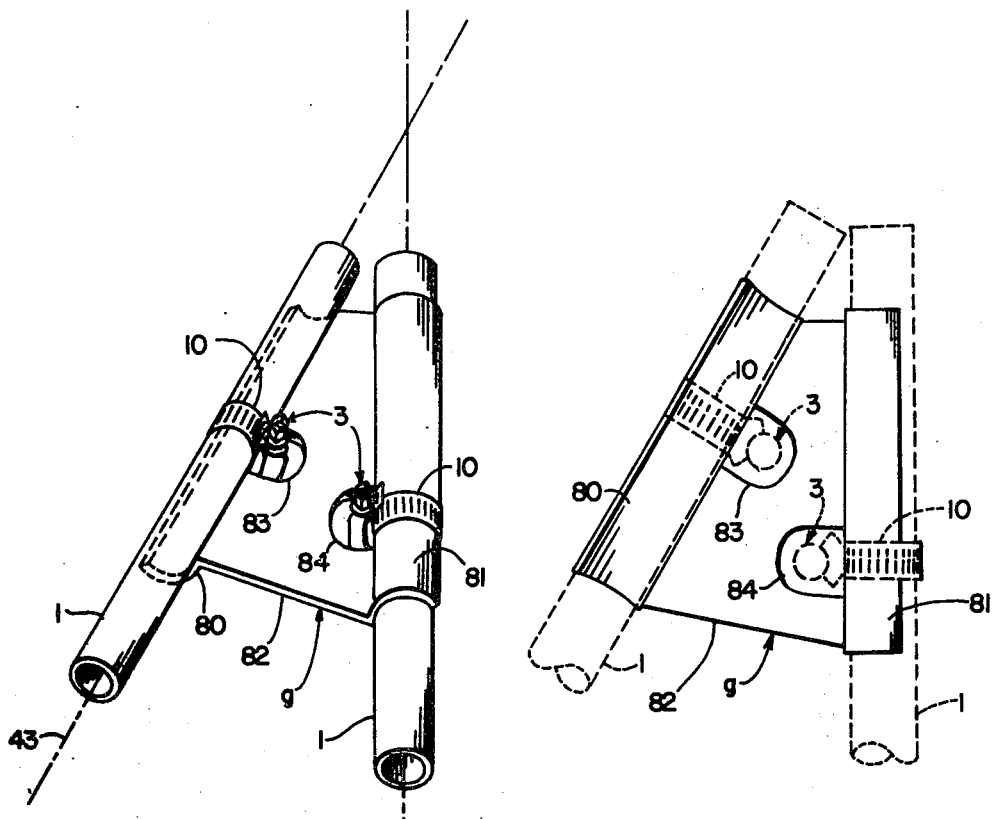

FIGS. 13 and 14 illustrate a clamp-connector in which the curved portions 80 and 81 are positioned so that tubular members 1 cradled therein lie in parallel planes and the axes 43 of tubular members 1 cross but do not intersect. Further, the tubular members cross at an angle of less than 90°. The tubular members are joined by a web 82 formed with openings 83 and 84 to receive the bands 10 of clamps 3. Curved portion 80 is in a concave position in respect to the convex position of curved portion 81.

Figure 15:
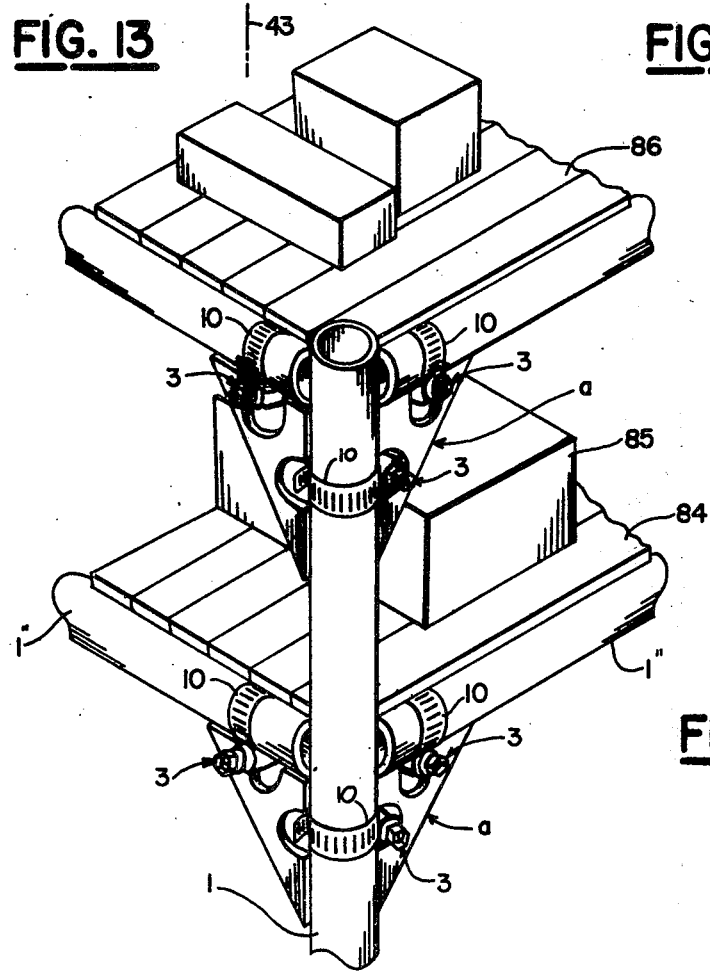

FIG. 15 shows a typical use of the system. Bracket a is attached to structural tubular post member 1 by strap 10 of clamp 3. Horizontal tubes 1" are connected to the bracket and to the horizontal structural tubes by bands 10 and clamps 3. A shelf 87 is held by the horizontal structural tubes which can hold articles 85. A second shelf 86 is supported by bracket a which is attached to the post by bands 10 and clamps 3. Bracing for the shelves could be provided by using the clamp-connectors shown in FIGS. 5-14.

The clamp connector may also be used as a jig in welding pipe. The clamp when used as a pipe jig could be made at any angle required for the welding operation.

I claim:
1. A structural system comprising:
   a. three structural circular elongated tubular members (1);
   b. a bracket member including:
   1. a first triangular web member (12) formed with a straight first inner edge (6) and a straight first edge (16) positioned at right angles to one another and also formed with a first opening (24) adjoining said first edge (16) and a second opening (23) adjoining said first inner edge (6),
   2. a second triangular web member (13) formed with a straight second inner edge (11) and a straight second edge (18) positioned at right angles to one another and also formed with a third opening (21) adjoining said second edge (18) and a fourth opening (22) adjoining said second inner edge (11),
   3. a first circular quarter-arc elongated curved portion (14) for receiving one of said tubular members (1) having a straight outer edge (15) connected to first inner edge (6) of said first web (12) and also having a second inner edge (16) joined to said second inner edge (11) of said second web (13) so that said first and second webs are connected at right angles to one another,
   4. a second circular quarter-arc elongated curved portion (17) for receiving another of said tubular members (1) and connected along an edge to said first edge (16) of said first web member (12) and positioned at right angles to said first curved portion (14),
   5. a third circular quarter-arc elongated curved portion (19) for receiving still another of said tubular members (1) and connected along an edge to said second edge (18) of said second web

(13) and positioned at right angles to said first and second curved portions (14) and (17),
6. said curved portions are positioned with respect to said web portions so that said structural circular tubular members cradled in said curved portions are adapted to intersect one another, c. a plurality of clamp members (3), each including:
1. a strap member (10) formed with a plurality of slots (9) and inserted through said openings (21-24) and encirculing said curved portions (14), (17), and (19) and said tubular members (1) cradled therein,
2. a housing (5) formed with a U-shaped member for receiving and holding said strap (10),
3. a worm gear (4) journaled for rotation within said housing (5) for engaging said slits (9) in said strap (10) and also formed with a tool engaging head for manual rotation of said worm gear;

d. said clamp members are selected so that a screw driver or hand wrench is capable of pulling said straps (10) in such close fitting frictional engagement around said tubular members (1) and said curved portions (14), (17), and (19) that said structural tubular members cannot move with respect to said bracket member.

2. A structural system as described in claim 1 comprising:

a. said first, second, third and fourth openings are dimensioned to receive said clamp housings and straps therethrough.

* * * * *

UNITED STATES PATENT AND TRADEMARK OFFICE
CERTIFICATE OF CORRECTION

PATENT NO. : 4,136,984
DATED : January 30, 1979
INVENTOR(S) : Henry T. Hayashi

It is certified that error appears in the above—identified patent and that said Letters Patent are hereby corrected as shown below:

Column 2, line 10, add the following:

--- Figure 13 is a perspective view of a clamp connector in which the tubular members cross at an angle of less than $90°$. ---

--- Figure 14 is a side view of the connector of Figure 13. ---

--- Figure 15 is a perspective view showing one use of the clamp of Figure 1. ---

Column 2, line 54, after another add --- and joined ---

Column 2, line 56, delete [and joined]

Column 4, line 19, after Horizontal add --- structural beam member ---

Signed and Sealed this

Twenty-second Day of May 1979

[SEAL]

Attest:

RUTH C. MASON
*Attesting Officer*

DONALD W. BANNER
*Commissioner of Patents and Trademarks*